United States Patent [19]
Isomura

[11] Patent Number: 5,999,159
[45] Date of Patent: *Dec. 7, 1999

[54] APPARATUS AND METHOD FOR DISPLAYING DOCUMENT ON DISPLAY

[75] Inventor: Hiroshi Isomura, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/516,142

[22] Filed: Aug. 17, 1995

[30] Foreign Application Priority Data

Feb. 6, 1995 [JP] Japan .................................. 7-017696

[51] Int. Cl.⁶ ...................... G09G 05/32; G09G 05/34
[52] U.S. Cl. .................. 345/112; 345/123; 345/124; 345/342
[58] Field of Search .................... 345/112, 113, 345/118, 123, 124, 125, 341, 342, 343

[56] References Cited

U.S. PATENT DOCUMENTS

| | | | |
|---|---|---|---|
| 4,694,406 | 9/1987 | Shibui et al. | 345/123 |
| 4,772,882 | 9/1988 | Mical | 345/146 |
| 4,903,013 | 2/1990 | Takeda | 345/123 |
| 5,038,138 | 8/1991 | Akiyama et al. | 345/123 |
| 5,175,813 | 12/1992 | Golding et al. | 345/123 |
| 5,299,303 | 3/1994 | Fukunaga | 395/146 |
| 5,317,306 | 5/1994 | Abraham et al. | 345/118 |
| 5,349,368 | 9/1994 | Takeda et al. | 345/124 |
| 5,351,189 | 9/1994 | Doi et al. | 345/123 |
| 5,544,358 | 8/1996 | Capps et al. | 395/785 |
| 5,623,282 | 4/1997 | Graham et al. | 345/121 |

FOREIGN PATENT DOCUMENTS 4-169965  6/1992  Japan .

*Primary Examiner*—Bipin H. Shalwala
*Assistant Examiner*—David L. Lewis
*Attorney, Agent, or Firm*—Staas & Halsey, LLP

[57] ABSTRACT

When the screen has a single display area, the document can be continuously and smoothly read by overwriting, upon input instruction, the following document from the beginning of an area by means of a display switchover unit. When the screen has two display areas, the document can be continuously and smoothly read by displaying, upon input instruction, the following document from the beginning of an area by means of a display switchover unit, alternately using the two areas.

37 Claims, 18 Drawing Sheets

```
60 ┌─ (11)  DK : DENMARK
   └─ (12)  ES : SPAIN
      (03)  DE : GERMANY
      (04)  GB : UNITED KINGDOM        52
      (05)  AT : AUSTRIA
      (06)  AU : AUSTRALIA              48-3
58    (07)  BG : BULGARIA
      (08)  BR : BRAZIL
      (09)  CA : CANADA
      (10)  CZ : CZECH REPUBLIC
```

FIG. 3

|  |  |
|---|---|
| (01) | JP : JAPAN |
| (02) | US : UNITED STATES OF AMERICA |
| (03) | DE : GERMANY |
| (04) | GB : UNITED KINGDOM |
| (05) | AT : AUSTRIA |
| (06) | AU : AUSTRALIA |
| (07) | BG : BULGARIA |
| (08) | BR : BRAZIL |
| (09) | CA : CANADA |
| (10) | CZ : CZECH REPUBLIC |
| (11) | DK : DENMARK |
| (12) | ES : SPAIN |
| (13) | FI : FINLAND |
| (14) | HU : HUNGARY |
| (15) | KR : REPUBLIC OF KOREA |
| (16) | LA : SRI LANKA |
| (17) | LU : LUXEMBOURG |
| (18) | MG : MADAGASCAR |
| (19) | MN : MONGOLIA |
| (20) | NL : NETHERLANDS |
| (21) | NO : NORWAY |
| (22) | NZ : NEW ZEALAND |
| (23) | PL : POLAND |
| (24) | PT : PORTUGAL |
| (25) | RO : ROMANIA |
| (26) | RU : RUSSIAN FEDERATION |
| (27) | SD : SUDAN |
| (28) | SE : SWEDEN |
| (29) | SK : SLOVAK REPUBLIC |
| (30) | UA : UKRAINE |

FIG. 4A

```
(01)   JP : JAPAN
(02)   US : UNITED STATES OF AMERICA
(03)   DE : GERMANY
(04)   GB : UNITED KINGDOM
(05)   AT : AUSTRIA
(06)   AU : AUSTRALIA
(07)   BG : BULGARIA
(08)   BR : BRAZIL
(09)   CA : CANADA
(10)   CZ : CZECH REPUBLIC
```
48-1

FIG. 4B

```
(11)   DK : DENMARK
(02)   US : UNITED STATES OF AMERICA
(03)   DE : GERMANY
(04)   GB : UNITED KINGDOM
(05)   AT : AUSTRIA
(06)   AU : AUSTRALIA
(07)   BG : BULGARIA
(08)   BR : BRAZIL
(09)   CA : CANADA
(10)   CZ : CZECH REPUBLIC
```
54, 52, 56, 48-2

FIG. 4C

```
(11)   DK : DENMARK
(12)   ES : SPAIN
(03)   DE : GERMANY
(04)   GB : UNITED KINGDOM
(05)   AT : AUSTRIA
(06)   AU : AUSTRALIA
(07)   BG : BULGARIA
(08)   BR : BRAZIL
(09)   CA : CANADA
(10)   CZ : CZECH REPUBLIC
```
54, 52, 56, 48-3

FIG. 4D

```
(11)  DK:DENMARK
(12)  ES:SPAIN
(13)  FI:FINLAND
(14)  HU:HUNGARY
(15)  KR:REPUBLIC OF KOREA
(16)  LA:SRI LANKA
(17)  LU:LUXEMBOURG
(18)  MG:MADAGASCAR
(19)  MN:MONGOLIA
(10)  CZ:CZECH REPUBLIC
```

```
(11)  DK:DENMARK
(12)  ES:SPAIN
(13)  FI:FINLAND
(14)  HU:HUNGARY
(15)  KR:REPUBLIC OF KOREA
(16)  LA:SRI LANKA
(17)  LU:LUXEMBOURG
(18)  MG:MADAGASCAR
(19)  MN:MONGOLIA
(20)  NL:NETHERLANDS
```

```
(21)  NO:NORWAY
(12)  ES:SPAIN
(13)  FI:FINLAND
(14)  HU:HUNGARY
(15)  KR:REPUBLIC OF KOREA
(16)  LA:SRI LANKA
(17)  LU:LUXEMBOURG
(18)  MG:MADAGASCAR
(19)  MN:MONGOLIA
(20)  NL:NETHERLANDS
```

```
(01)  JP : JAPAN
(02)  US : UNITED STATES OF AMERICA
(03)  DE : GERMANY
(04)  GB : UNITED KINGDOM
(05)  AT : AUSTRIA
(06)  AU : AUSTRALIA
(07)  BG : BULGARIA
(08)  BR : BRAZIL
(09)  CA : CANADA
(10)  CZ : CZECH REPUBLIC
```
48-1

FIG. 6B

```
60 ⎰ (11)   DK : DENMARK
   (02)  US : UNITED STATES OF AMERICA
   (03)  DE : GERMANY                     52
   (04)  GB : UNITED KINGDOM
   (05)  AT : AUSTRIA
58 (06)  AU : AUSTRALIA                   48-2
   (07)  BG : BULGARIA
   (08)  BR : BRAZIL
   (09)  CA : CANADA
   (10)  CZ : CZECH REPUBLIC
```

FIG. 6C

```
60  ┌ (11)  DK : DENMARK
    └ (12)  ES : SPAIN
      (03)  DE : GERMANY
      (04)  GB : UNITED KINGDOM         52
      (05)  AT : AUSTRIA
      (06)  AU : AUSTRALIA              48-3
58    (07)  BG : BULGARIA
      (08)  BR : BRAZIL
      (09)  CA : CANADA
      (10)  CZ : CZECH REPUBLIC
```

FIG. 6D

```
      (11)  DK : DENMARK                48-4
      (12)  ES : SPAIN
      (13)  FI : FINLAND
      (14)  HU : HUNGARY
60    (15)  KR : REPUBLIC OF KOREA
      (16)  LA : SRI LANKA
      (17)  LU : LUXEMBOURG
      (18)  MG : MADAGASCAR
      (19)  MN : MONGOLIA
58    (10)  CZ : CZECH REPUBLIC
                                         52
```

FIG. 7A

| | | | |
|---|---|---|---|
| (01) | JP | : JAPAN | 48-11 |
| (02) | US | : UNITED STATES OF AMERICA | |
| (03) | DE | : GERMANY | |
| (04) | GB | : UNITED KINGDOM | |
| (05) | AT | : AUSTRIA | |
| (06) | AU | : AUSTRALIA | |
| (07) | BG | : BULGARIA | |
| (08) | BR | : BRAZIL | |
| (09) | CA | : CANADA | |
| (10) | CZ | : CZECH REPUBLIC | |

FIG. 7B

| | | | |
|---|---|---|---|
| (11) | DK | : DENMARK | 48-12 |
| (12) | ES | : SPAIN | |
| (13) | FI | : FINLAND | |
| (14) | HU | : HUNGARY | |
| (15) | KR | : REPUBLIC OF KOREA | |
| (06) | AU | : AUSTRALIA | 52 |
| (07) | BG | : BULGARIA | |
| (08) | BR | : BRAZIL | |
| (09) | CA | : CANADA | |
| (10) | CZ | : CZECH REPUBLIC | |

FIG. 7C

| | | |
|---|---|---|
| (11) | DK | : DENMARK |
| (12) | ES | : SPAIN |
| (13) | FI | : FINLAND |
| (14) | HU | : HUNGARY |
| (15) | KR | : REPUBLIC OF KOREA |
| (16) | LA | : SRI LANKA |
| (17) | LU | : LUXEMBOURG |
| (18) | MG | : MADAGASCAR |
| (19) | MN | : MONGOLIA |
| (20) | NL | : NETHERLANDS |

| | | |
|---|---|---|
| (21) | NO | : NORWAY |
| (22) | NZ | : NEW ZEALAND |
| (23) | PL | : POLAND |
| (24) | PT | : PORTUGAL |
| (25) | RO | : ROMANIA |
| (16) | LA | : SRI LANKA |
| (17) | LU | : LUXEMBOURG |
| (18) | MG | : MADAGASCAR |
| (19) | MN | : MONGOLIA |
| (20) | NL | : NETHERLANDS |

```
        ┌─────────────────────────────────────────┐  48-21
        │ (01)  JP:JAPAN                          │
        │ (02)  US:UNITED STATES OF AMERICA       │
   70 ──│ (03)  DE:GERMANY                        │
        │ (04)  GB:UNITED KINGDOM                 │
        │ (05)  AT:AUSTRIA                        │
        ├─────────────────────────────────────────┤
        │ (06)  AU:AUSTRALIA                      │
        │ (07)  BG:BULGARIA                       │
   72 ──│ (08)  BR:BRAZIL                         │
        │ (09)  CA:CANADA                         │
        │ (10)  CZ:CZECH REPUBLIC                 │
        └─────────────────────────────────────────┘
```

FIG. 8B

```
        ┌─────────────────────────────────────────┐  48-22
        │ (11)  DK:DENMARK                        │
        │ (02)  US:UNITED STATES OF AMERICA       │── 52
   70 ──│ (03)  DE:GERMANY                        │
        │ (04)  GB:UNITED KINGDOM                 │
        │ (05)  AT:AUSTRIA                        │
        ├─────────────────────────────────────────┤
        │ (06)  AU:AUSTRALIA                      │
        │ (07)  BG:BULGARIA                       │
   72 ──│ (08)  BR:BRAZIL                         │
        │ (09)  CA:CANADA                         │
        │ (10)  CZ:CZECH REPUBLIC                 │
        └─────────────────────────────────────────┘
```

FIG. 8C

```
        ┌─────────────────────────────────────────┐  48-23
        │ (11)  DK:DENMARK                        │
        │ (12)  ES:SPAIN                          │
   70 ──│ (13)  FI:FINLAND                        │
        │ (14)  HU:HUNGARY                        │
        │ (15)  KR:REPUBLIC OF KOREA              │
        ├─────────────────────────────────────────┤
        │ (16)  LA:SRI LANKA                      │
        │ (07)  BG:BULGARIA                       │── 52
   72 ──│ (08)  BR:BRAZIL                         │
        │ (09)  CA:CANADA                         │
        │ (10)  CZ:CZECH REPUBLIC                 │
        └─────────────────────────────────────────┘
```

FIG. 10A

```
(01)  JP : JAPAN
(02)  US : UNITED STATES OF AMERICA
(03)  DE : GERMANY
(04)  GB : UNITED KINGDOM
(05)  AT : AUSTRIA

(06)  AU : AUSTRALIA
(07)  BG : BULGARIA
(08)  BR : BRAZIL
(09)  CA : CANADA
(10)  CZ : CZECH REPUBLIC
```

FIG. 10B

```
(11)  DK : DENMARK
(02)  US : UNITED STATES OF AMERICA
(03)  DE : GERMANY
(04)  GB : UNITED KINGDOM
(05)  AT : AUSTRIA

(06)  AU : AUSTRALIA
(07)  BG : BULGARIA
(08)  BR : BRAZIL
(09)  CA : CANADA
(10)  CZ : CZECH REPUBLIC
```

FIG. 10C

```
(11)  DK : DENMARK
(12)  ES : SPAIN
(13)  FI : FINLAND
(14)  HU : HUNGARY
(15)  KR : REPUBLIC OF KOREA

(16)  LA : SRI LANKA
(07)  BG : BULGARIA
(08)  BR : BRAZIL
(09)  CA : CANADA
(10)  CZ : CZECH REPUBLIC
```

FIG.11A 48-31

(01) JP : JAPAN
(02) US : UNITED STATES OF AMERICA
(03) DE : GERMANY
(04) GB : UNITED KINGDOM
(05) AT : AUSTRIA

70

(06) AU : AUSTRALIA
(07) BG : BULGARIA
(08) BR : BRAZIL
(09) CA : CANADA
(10) CZ : CZECH REPUBLIC

(11) DK : DENMARK
(02) US : UNITED STATES OF AMERICA
(03) DE : GERMANY
(04) GB : UNITED KINGDOM
(05) AT : AUSTRIA 76  52  70

(06) AU : AUSTRALIA
(07) BG : BULGARIA
(08) BR : BRAZIL
(09) CA : CANADA
(10) CZ : CZECH REPUBLIC

```
(01)  JP : JAPAN
(02)  US : UNITED STATES OF AMERICA
(03)  DE : GERMANY
(04)  GB : UNITED KINGDOM
(05)  AT : AUSTRIA

(06)  AU : AUSTRALIA
(07)  BG : BULGARIA
(08)  BR : BRAZIL
(09)  CA : CANADA
(10)  CZ : CZECH REPUBLIC
```

FIG. 12B

```
(11)  DK : DENMARK
(12)  ES : SPAIN
(13)  FI : FINLAND
(14)  HU : HUNGARY
(15)  KR : REPUBLIC OF KOREA

(06)  AU : AUSTRALIA
(07)  BG : BULGARIA
(08)  BR : BRAZIL
(09)  CA : CANADA
(10)  CZ : CZECH REPUBLIC
```

FIG. 12C

```
(11)  DK : DENMARK
(12)  ES : SPAIN
(13)  FI : FINLAND
(14)  HU : HUNGARY
(15)  KR : REPUBLIC OF KOREA

(16)  LA : SRI LANKA
(17)  LU : LUXEMBOURG
(18)  MG : MADAGASCAR
(19)  MN : MONGOLIA
(20)  NL : NETHERLANDS
```

FIG. 14A

```
(01)  JP : JAPAN
(02)  US : UNITED STATES OF AMERICA
(03)  DE : GERMANY
(04)  GB : UNITED KINGDOM
(05)  AT : AUSTRIA

(06)  AU : AUSTRALIA
(07)  BG : BULGARIA
(08)  BR : BRAZIL
(09)  CA : CANADA
(10)  CZ : CZECH REPUBLIC
```

FIG. 14B

```
(11)  DK : DENMARK
(12)  ES : SPAIN
(13)  FI : FINLAND
(14)  HU : HUNGARY
(15)  KR : REPUBLIC OF KOREA

(06)  AU : AUSTRALIA
(07)  BG : BULGARIA
(08)  BR : BRAZIL
(09)  CA : CANADA
(10)  CZ : CZECH REPUBLIC
```

FIG. 14C

```
(11)  DK : DENMARK
(12)  ES : SPAIN
(13)  FI : FINLAND
(14)  HU : HUNGARY
(15)  KR : REPUBLIC OF KOREA

(16)  LA : SRI LANKA
(17)  LU : LUXEMBOURG
(18)  MG : MADAGASCAR
(19)  MN : MONGOLIA
(20)  NL : NETHERLANDS
```

FIG. 15A

```
        (01)  JP:JAPAN
        (02)  US:UNITED STATES OF AMERICA
        (03)  DE:GERMANY
     ◆  (04)  GB:UNITED KINGDOM
        (05)  AT:AUSTRIA

(06)  AU:AUSTRALIA
        (07)  BG:BULGARIA
        (08)  BR:BRAZIL
        (09)  CA:CANADA
        (10)  CZ:CZECH REPUBLIC
```

FIG. 15B

```
     ◆  (04)  GB:UNITED KINGDOM
        (05)  AT:AUSTRIA
        (06)  AU:AUSTRALIA
        (07)  BG:BULGARIA
        (08)  BR:BRAZIL

(09)  CA:CANADA
        (10)  CZ:CZECH REPUBLIC
        (11)  DK:DENMARK
        (12)  ES:SPAIN
        (13)  FI:FINLAND
```

APPARATUS AND METHOD FOR DISPLAYING DOCUMENT ON DISPLAY

BACKGROUND OF THE INVENTION

The present invention relates to an apparatus and a method for displaying document data on a display. More particularly, the present invention relates to an apparatus and a method for displaying document data larger than a document displaying area of a display.

Along with popularization of computer, letters and reports conventionally read on paper documents have now been read more often as electronic documents such as electronic mail and electronic reports on displays of computers. Because of various factors including the screen size and resolution, what is displayed on a display of a computer is not always more legible than paper documents, but chances of reading documents on a display tend to increase further hereafter. There is therefore a demand for a method for more legible display.

In the conventional methods of display of a document display apparatus, methods for displaying a document in an area on the display and then displaying the next document include the scrolling method and the screen switchover method. The scrolling method is to display sequentially the following documents on the screen while acting on a scroll key, and is widely applied. The screen switchover method consists of rewriting an entire display area into the next document and corresponds to paging in the case of a paper document.

In the conventional scrolling method, however, it is virtually impossible to read the document during scrolling, and upon completion of scrolling, the last read portion before scrolling must be searched for, leading to an inconvenience of temporary interruption of reading operation. For screen switchover method cannot be a sufficiently satisfactory method in that the next or the preceding document cannot be compared on the same screen shortly before and after rewriting. It is therefore inconvenient when continuously reading a long electronic document, resulting in a lower reading efficiency and a serious fatigue.

SUMMARY OF THE INVENTION

The present invention relates to an apparatus and method for displaying a document, permitting efficient reading of an electronic document. The document display apparatus according to one embodiment of the invention has a display unit displaying a document in a screen area having a prescribed number of display lines. A document storage unit stores document data exceeding the screen area, and a display processing unit cuts a data area of the screen area from among document data of the document storage unit and displays it on the display unit. Additionally, an input instruction unit instructs to display data not currently displayed on the screen area, and a display switchover unit cuts the data area in units of at least a line, and switches over the thus cut area to the line position next to the display line currently located at the top of the screen area. The display switchover unit provides a boundary line between the switchover-displayed area and the area before switchover display, and characters displays the characters and background between the switchover-displayed area and the area before facilitating discrimination between the two display areas. When a return direction instruction is received for display switchover of document data, the display switchover unit cuts the data area back by the screen area in units of at least one line, and switchover-displays the data to a display line currently located at the top of the screen area, making it possible to read the document again.

In the method for displaying a document according to the present invention, data displayed on a screen area is cut from document data of a document storage unit, and displayed on the display unit.

During a display switchover step, data not currently displayed on the screen area is cut and switchover displayed to a line position next to the display line currently located at the top of the screen area.

The details of this method for displaying a document are the same as in the apparatus of the invention.

According to another embodiment of the present invention an apparatus divides the screen area into a first and a second display area, cuts individual areas from document data of the document storage unit, and displays the cut data areas. The display switchover unit cuts data area not currently displayed on the screen area in units of at least a line, and switchover-displays the cut data area at the line position next to the first or second display area currently located at the top. This switchover display may be such that the first display area and the second display area are alternately and sequentially switched over. When the return direction is specified as the display switchover direction, a data area retroactively, by an amount corresponding to the screen area, is cut in units of at least a line. The cut data area is then displayed in the first or second display area by switching over to the line position currently located at the top. When an arbitrary line in the first or the second display area is specified as the top position, switchover-display is accomplished such that the specified top position is located at the top line of the first display area. Areas having a congruent form are horizontally or vertically arranged as the first and second display areas of the screen area.

In the method for displaying a document according to the present invention first and second display areas result from division of the screen area, and data in the two display areas is displayed.

An input instruction instructs display switchover of the data area not currently displayed on the screen area, and the data not currently displayed on the screen area is switchover-displayed at the line position next to the first or second display area in which the top display line is currently located.

According to the apparatus and the method for displaying a document of the present invention, it is possible to continuously and smoothly read a document by overwriting the next document from the beginning of an area, or by displaying the document through alternate use of the two areas, without scrolling action even when having a document display area or two document display areas on the screen, and sequentially displaying a long document. Since the line of vision of the reader regularly reciprocates in one or two document display areas, the document is legible, thus alleviating fatigue of the eyes. The two documents can clearly be discriminated by using different types of characters or different colors between the initial document and the overwritten one within a single document display area. By specifying an arbitrary line in the display area as the top position, a document displayed in two different areas can be read unaffectedly by modifying the position of a series of documents into another position beginning at the top.

The above and other objects, features and advantages of the present invention will become more apparent from the following detailed description with reference to the drawings.

BRIEF DESCRIPTION OF THE DRAWINGS

FIG. 3 is a descriptive view of document data of FIG. 2;

FIGS. 4A to 4F are descriptive views of display switchover in units of a line in the present invention for a display area;

FIGS. 6A to 6D are descriptive views of display switchover in units of a line in the present invention having different colors of background;

FIGS. 7A to 7D are descriptive views of display switchover in units of five lines in the present invention for a display area;

FIGS. 8A to 8C are descriptive views of display switchover in units of a line in the present invention for two display areas;

FIGS. 10A to 10C are descriptive views in cases where different background colors are used for cases shown in FIGS. 8A to 8C;

FIGS. 11A and 11B are descriptive views in a case where two display areas are arranged to the right and left;

FIGS. 12A to 12C are descriptive views of the present invention in which display switchover of two display areas is effected in units of display area;

FIGS. 14A to 14C are descriptive views in cases where different background colors are used in FIGS. 12A to 12C; and FIGS. 15A and 15B are descriptive views of display switchover in which an arbitrary display position is moved to the top position.

DETAILED DESCRIPTION OF THE PREFERRED EMBODIMENT

Figure 1:
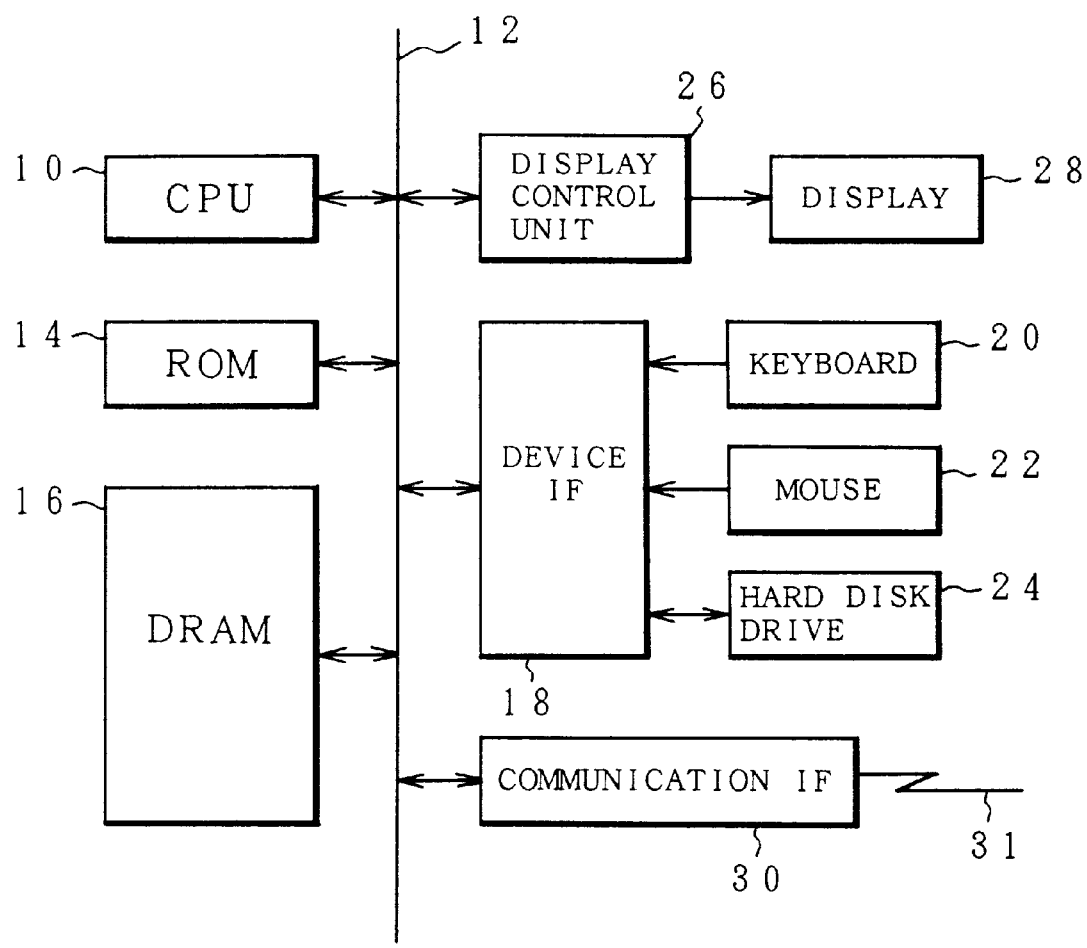
FIG. 1 is a block diagram showing the operation environment for the present invention.

FIG. 1 shows the operating environment of the document display apparatus of the present invention, with a personal computer as an example. An ROM 14 housing a control program and an RAM 16 serving as a memory for deploying document data are connected to a bus 12 of a CPU 10. A keyboard 21 and a mouse 22 serving as input means are connected to the bus 12 through a device interface 18. As an external storage unit, a hard disk drive 24 is connected. As the device interface 18, for example, an SCSI is used. A display 28 serving as a display unit is connected to the CPU 10 through a display control unit 26. As the display 28, a color CRT unit or a liquid crystal display unit is used. In addition, a communication line 31 is connected to the bus 12 of the CPU 10 through a communication interface 30 to permit document communication such as electronic mail with other personal computers through a public telephone line or Internet.

Figure 2:
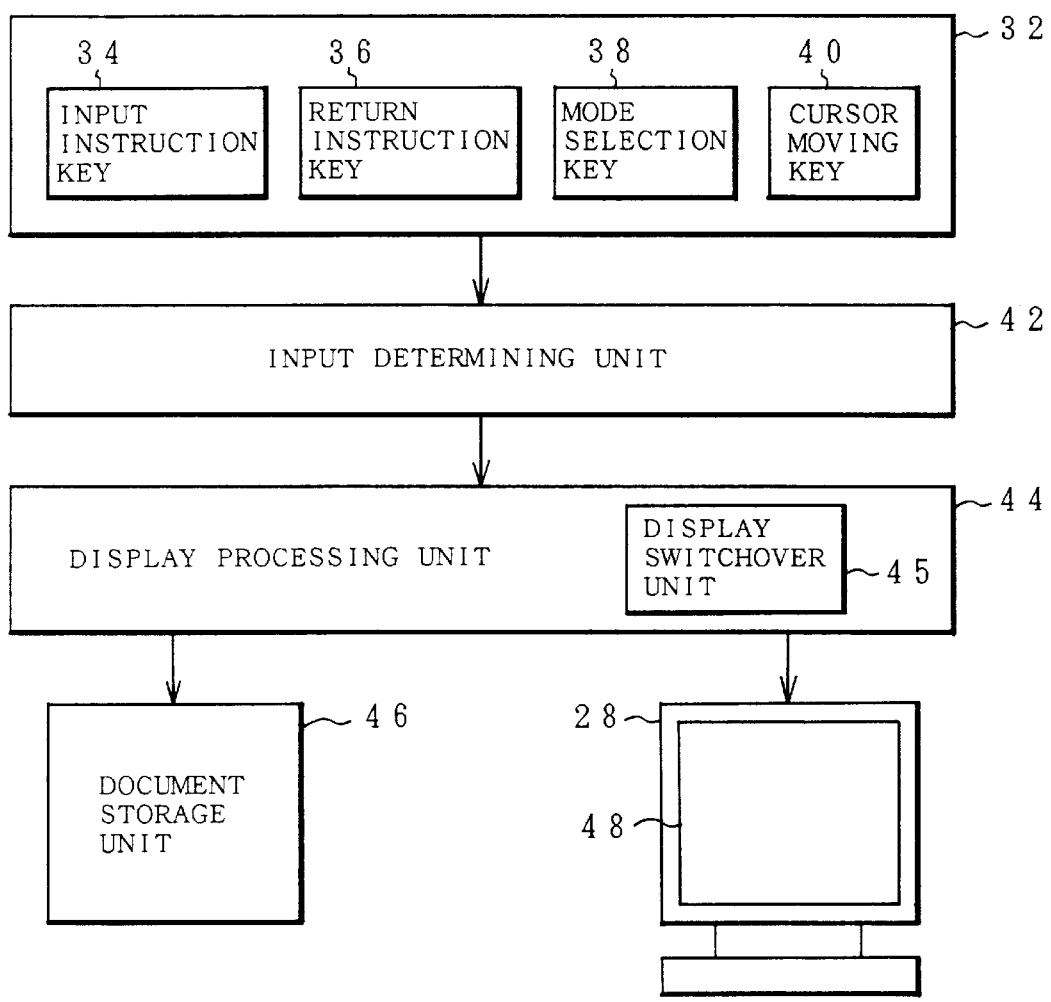
FIG. 2 is a block diagram showing functions of the present invention.

FIG. 2 is a functional block diagram of the document display apparatus of the present invention as achieved in the operating environment shown in FIG. 1. The document display apparatus of the present invention comprises an input instruction unit 32, an input determination unit 42, a display processing unit 44, a display switchover unit 45, a document storage unit 46, and a display unit based on a display 28. An input instruction key 34, a return instruction key 36, a mode selection key 38 and a cursor moving key 40 operable by acting on any of function keys provided on a keyboard 20 are provided for document display of the present invention. The input instruction key 34 instructs display switchover of the following portion of the document currently displayed in a screen area 48 of the display 28. The return instruction key 36 selects a display direction of the document displayed in the screen area 48. In a state in which the return instruction key 36 is not operated, the display direction of the document is in a direction in compliance with the writing sequence of the document, and upon acting on the return instruction key 36, the display direction is switched over to the reverse direction, i.e., to the return direction reading retroactively the document. The mode selection key 38 selects any of the display modes depending upon whether one or two display areas are provided in the screen area 48 of the display. In operating the mode selection key 38, it is possible to select switchover or not in units of switched lines or areas in each mode. The cursor moving key 40 is used when switching over the display to the top position by specifying an arbitrary display line in the case where two display areas are provided in the screen area 48. The input determination unit 42 analyzes key codes resulting from operation of the input instruction key 34, the return instruction key 36, the mode selection key 38 or the cursor moving key 40 provided in the input instruction unit 32, and outputs a control command based on the result of analysis to the display processing unit 44 and the display switchover unit 45. The display processing unit 44 reads out a specified document on the basis of a document specification relative to a document menu stored in the document storage unit using the screen area 48 of the display 28, and causes display in the screen area 48 from the top. After display of the top area of display data by the display processing unit 44, the display switchover unit 45 effects switchover display of a data area not displayed on the screen in response to a control command based on an input instruction from the input instruction unit 32.

In FIG. 3, an example of document data stored in the document storage unit 46 shown in FIG. 2 is illustrated in the form of a memory map. The document data 50 show abbreviations and full denominations of various nations in units of line, and figures in parentheses to the left represent line numbers shown for the convenience of explanation. For such document data 50, the screen area 48 in the display 28 is a tight area that can display only ten lines of the document data 50.

FIGS. 4A to 4F show document display processing of the present invention in the case where a single display area is provided in the display 28. First, when specifying a document to be read through menu selection from the document storage unit 46, an area of ten lines is cut from the top of the document data 50 shown in FIG. 3 and displayed, as shown in the screen area 48-1 in FIG. 4A by the display processing unit 44. When pressing the input instruction key 34 provided in the input instruction unit 32 shown in FIG. 2 in this state, "DK: Denmark" of Line No. (11) in the document data 50 currently not displayed is overwritten on "JP: Japan" of Line No. (01) which is currently the displayed line at the top in FIG. 4A, and the display is switched over as shown in FIG. 4B. At this point, a partition line 52 for discriminating the area after switchover 54 from the area before switchover 56 is displayed between these areas. FIG. 4c shows a case where the third input instruction is made: the display is switched over as shown in the area 54 in response to the number of input instructions, and the partition line 52 also displaces. FIG. 4D shows a state in which the display has been switched over until there remains only the last line of the first area 56. When further making an input instruction, the last line located at the top in FIG. 4D is rewritten as shown in the screen area 48-5 in FIG. 4E. The state of display of this screen area 48-5 is in a state in which a display area of one screen, i.e., display of ten lines has been completed as compared with FIG. 4A. Upon making a further input instruction, a Line No. (21) is displayed at the position of the first line as shown in a screen area 48-6 of FIG. 4F, and another partition line 52 is displayed as well.

Figure 5:
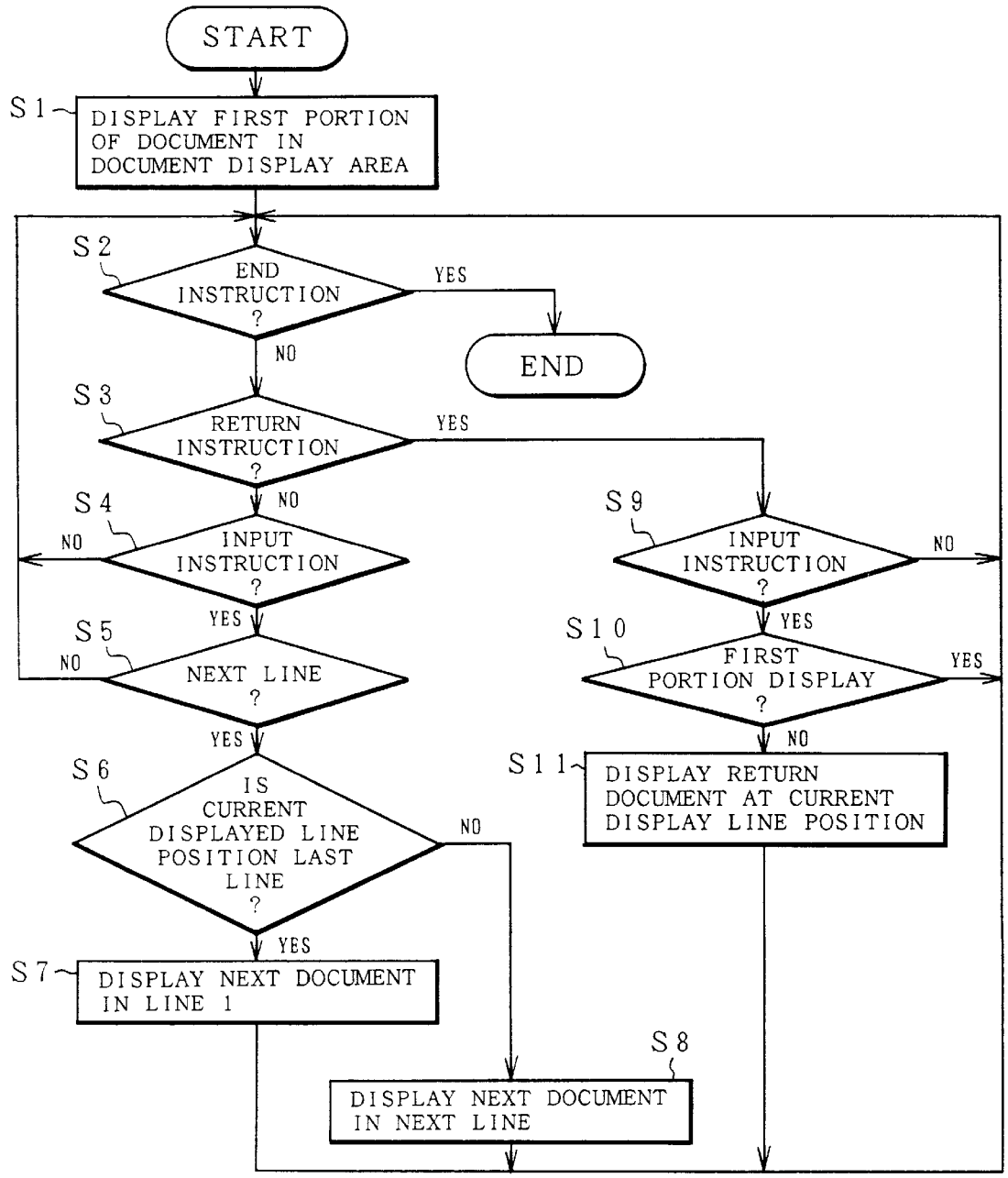
FIG. 5 is a flowchart of processing operations shown in FIGS. 4A to 4F.

FIG. 5 is a flowchart of document display processing using a single display area of FIGS. 4A to 4F. First, at step S1, when a document to be displayed stored in the document storage unit 46 of FIG. 2 is specified by the selection using the right-hand screen on the display, the top unit of the document specified in the document display area of the display 28, for example, the top unit of the document of ten lines contained in the display area 48 indicated by a dotted line, in the document data 50 of FIG. 3. Then at step S2, the presence of an end instruction is checked, followed by a checkup of the presence of a return instruction at step S3. As the return instruction key 36 provided in the input instruction unit 32 is not usually operated, presence of an input instruction by the input instruction key 34 is checked at step S4. When an input instruction is identified at step S4, it is checked, at the next step S5, whether or not the document data 50 shown in FIG. 3 contains the display area currently to be processed, i.e., document data of the line next to the last line of Line No. (10) shown in FIG. 4A in the state of display of the document initial unit. If there is document data of the next line, it is checked if the position of the currently displayed line is at the last line or not. In the state of display of the initial screen, as shown in FIG. 4A, the currently displayed line is at the position of the last line of Line No. (10). The following document is displayed at the first line at the next step S7. That is, the document of Line No. (11) which is the next document is displayed at the first line as shown in FIG. 4B. A partition line 52 is of course displayed at the same time at this point. When the currently displayed line is not at the position of the last line, the next document is displayed at step S8 as follows. When the currently displayed line is at the position of the first line in the state of FIG. 4B, for example, the document of the next Line No. (12) is displayed at the position of the second line, as shown in FIG. 4C. The processing operations of steps S3 to S8 are repeated until an end instruction is received from the operator at step S2. When a return instruction is identified by the operation of the return instruction key 36 shown in FIG. 2 at step S3, processing operations of steps S9 to S13 are carried out. At step S9, the presence of an input instruction by the input instruction key 34 is checked, and if present, it is checked whether or not the display screen has been restored to the initial screen displayed at step S1. If not the initial screen, the return document is displayed at the position of the line currently to be processed at step S11. The term return document as used here means the display data specified by Line No. obtained by subtracting the number of lines of the screen area 48 from Line No. of the display line currently to be processed. For example, when the current display screen is the screen area 48-3 shown in FIG. 4C, Line No. (02) is determined by subtracting ten lines, the number of lines of the screen area from Line No. (12), since the position of the line currently to be processed is Line-No. (12), which is the second line, "ES: Spain." This Line No. (02) represents the return document, and the display can be restored to the screen area 48-2 preceding that shown in FIG. 4B by reading out Line No. (02) "US: United States of America" from the document data 50 shown in FIG. 3 and overwriting it on the displayed line "ES: Spain" located at the second line of FIG. 4C. It is needless to mention that the partition line 52 is switched over, upon display of the return document, from the second line of FIG. 4C to the first line of FIG. 4B.

FIGS. 6A to 6D show another embodiment of document display in units of line in a single display area. The display is switched over in the same manner as in FIGS. 4A to 4D except that the area before switchover 58 is discriminated from the area after switchover 60 by different colors of background. Because attention is paid to the area after switchover 60, the background color for the area after switchover 60 should preferably be white, for example, which permits easy reading, and in contrast, the background color for the area before switchover 58 should preferably be grey. Apart from being colorless, the background colors for the area before switchover 58 and the area after switchover 60 may be any appropriate colors. While, in FIGS. 6B to 6D, different colors are used for the area before switchover 58 and the area after switchover 60, and at the same time, the partition line 52 is displayed, only different background colors may be used without displaying the partition line 52. Furthermore, different colors may be used for displayed characters between the area before switchover 58 and the area after switchover 60 as different display screens.

FIGS. 7A to 7D shows display switchover when specifying switchover of five lines in a run of input instruction in the document display using a single display area. When the number of lines of five is thus specified for display switchover, upon an input instruction issued following the initial display of a screen area 48-11 shown in FIG. 7A, a document display of five lines including Line Nos. (11) to (15) is switched over to an area 64 covering the first to the fifth lines as shown in a screen area 48-12 of FIG. 7B, and the partition line 52 is simultaneously displayed. A further issuance of another input instruction leads to a screen area 48-13 to which switchover of the sixth to the tenth lines including Nos. (16) to (20) has been accomplished, as shown in FIG. 7C. Upon another input instruction, as shown in FIG. 7D, the display is switched over to the screen area 48-1 in which the first to the fifth lines including Line Nos. (21) to (25) are displayed. In such document display using a single display area, it is possible to arbitrarily specify a number of lines to be displayed in a single run of display switchover within the number of lines in the single screen area 48, for example within the range of ten lines.

FIGS. 8A to 8C are descriptive views illustrating document display effected by dividing the screen area 48 on the display 28 into two, in terms of a display switchover in units of line as an embodiment. First, the display area on the screen is divided into a first area 70 and a second area 72 as shown by a screen area 48-21 in FIG. 8A. The first area 70 and the second area 72 have the same form both with five display lines, arranged vertically in this embodiment. FIG. 8A shows a state in which the document initial unit is displayed from among the document data 50 of FIG. 3. This display of the initial unit comprises first displaying five lines in the first area 70, and then, after confirming the presence of following document data, displaying another five lines in the second area 72. When giving an input instruction in the state of display of the initial document shown in FIG. 8A, data display of the next Line No. (11) is performed by overwriting at the first line of the first area 70, as shown in FIG. 4B. The partition line 52 for discriminating the area after switchover from the area before switchover is simultaneously displayed. FIG. 8C shows a screen area 48-23 in which display switchover of the first line of the second area 72 has been accomplished through repetition of input instruction.

Figure 9:
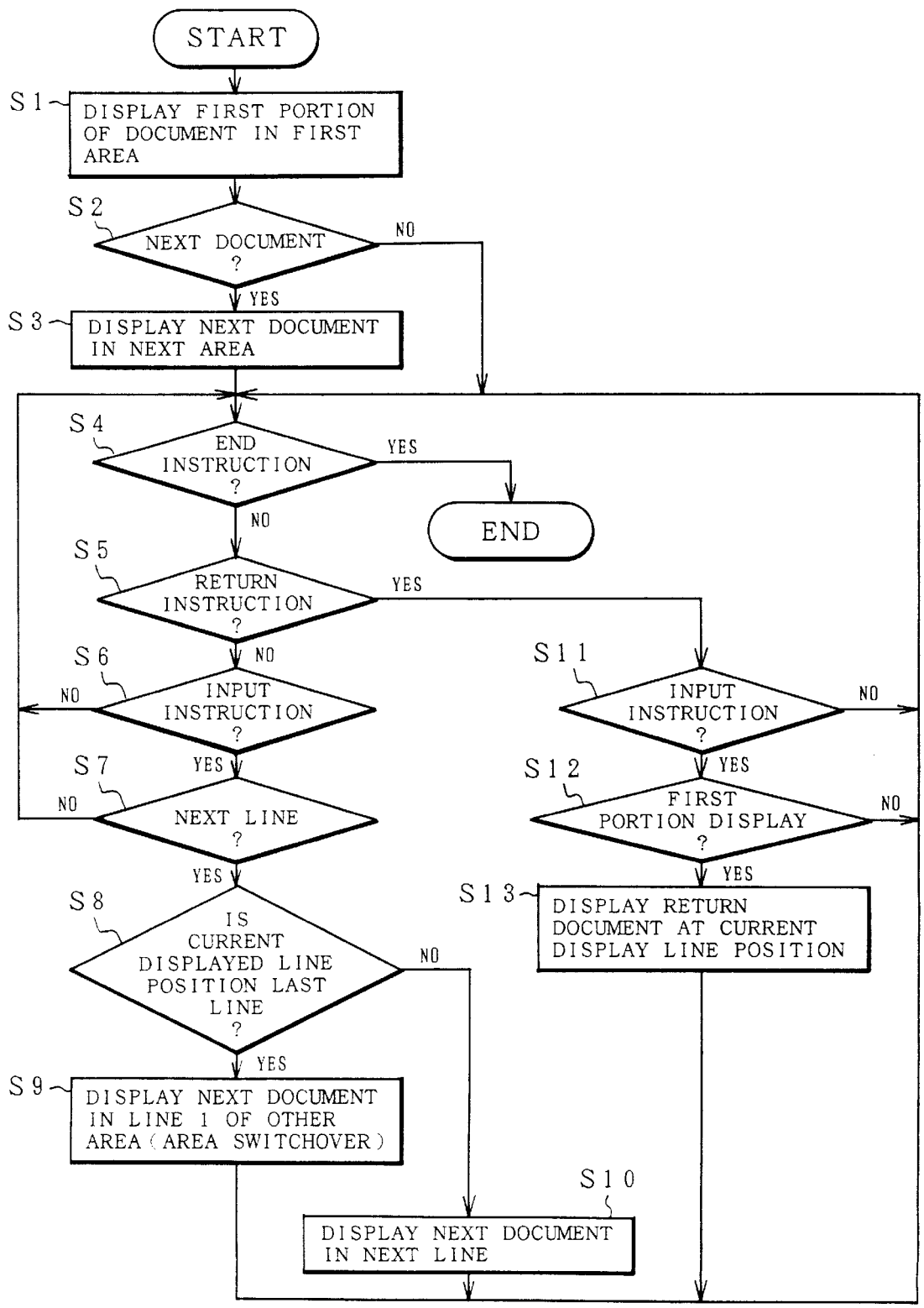
FIG. 9 is a flowchart of processing operations shown in FIGS. 8A to 8C.

FIG. 9 is a flowchart of document display processing in which a first area 70 and a second area 72 are provided in the display area of FIGS. 8A to 8C. First at step S1, from among the document data of the specified document storage unit 46 of FIG. 2, for example, from among the document data 50 of FIG. 3, the document initial unit, for example, the top five lines of the document data 50 are displayed in the first area 70. This is followed by step S2 in which it is checked if the document data 50 has the following document or not. As there is a following document in this case, the following document is displayed in the second area 72 serving as the following area at step S3. This brings about the initial display state of a screen area 48-21 of FIG. 8A. Then at step S4, the presence of an end instruction by the operator is checked. Because of the absence of an end instruction in this case, the presence of a return instruction by the return instruction key 36 provided in the input instruction unit 32 of FIG. 2 is checked at step S5. Since there is not return instruction at the beginning of reading of a document, the presence of an input instruction by the operation of the input instruction key 34 provided in the input instruction unit 32 of FIG. 2 is checked at step S6. If there is one, the presence of document data to be displayed next is checked at step S7. In the presence of document data, it is checked whether or not the area currently to be displayed is the last line of an area at step S8. As the line to be currently processed in the state of initial display in the screen area 48-21 of FIG. 8A is the last line of the second area 72, the following document is displayed at the position of the first line of the other area, i.e., at the position of the first line in the first area, thereby switching over the display to the screen area 48-22 shown in FIG. 8B. If at step S8, on the other hand, the display line currently to be processed is not the last line, the following document is displayed at the position of the next line at step S10. When the displayed document is to be returned in the middle of such document display, it suffices to act on the return instruction key 36 shown in FIG. 2, and then operate the input instruction key 34. At this point, a return instruction is identified, and processing operations of steps S11 to S13 are performed. First, the input instruction is identified at step S11, and at step S12, it is checked if the display has been returned to the initial display or not: if the display has not been returned to the initial display, the return document is displayed at the position of the display line currently to be processed at step S13. The term return document means display data of Line No. obtained by subtracting the number of lines displayed in the first area 70 and the second area 72 from Line No. of the display data of the display line currently to be processed. The displayed document; can thus be restored line by line by such processing.

FIGS. 10A to 10C show further another embodiment in which the display area is divided into two including a first area 70 and a second area 72, and which is characterized by the use of different background colors for an area before display 74 and an area after display 76. The screen areas 48-21 to 48-23 are the same as in FIGS. 8A to 8C: upon switchover of display of the first line in the first area 70 of FIG. 10B, the area after switchover 76 has a background color different from that of the area before switchover 74. For example, the area before switchover 74 may have a background color of grey and the background color for the area after switchover should preferably be white to permit easy reading. Because the second area 72 has not as yet been switched, it has the same background color as that of the area before switchover 74 of the first area 70. FIG. 10C shows a state in which display of up to the first line of the second area 72 has been switched over: the entire first area 70 has the background color for that after switchover, and in the second area 72, the first line falls under the area after switchover 76, and the subsequent lines become under the area before switchover 74, having different background colors. In FIGS. 10A to 10C, the area before switchover 74 and the area after switchover 76 have different background colors, and at the same time, a partition line 52 is displayed. The partition line 52 may be omitted. As another means to discriminate the areas between before and after display, the colors of displayed characters may be different between the area before switchover 74 and the area after switchover 76.

FIGS. 11A and 11B show another embodiment of screen arrangement with the display area divided into two. This embodiment is characterized in that these areas are arranged to the right and the left. More specifically, as shown in FIG. 11A, a first area 70 and a second area 72 are arranged, one to the right and the other to the left on a screen area 48-31. In this embodiment, the first area 70 and the second area 72 have the same shape and size. FIG. 11A shows a state in which the initial document is displayed from among the document data 50 of FIG. 3. An input instruction in this state causes rewriting of the first line in the first area 70 into data of document No. (11). The area after switchover 76 has different colors for the partition line 52 and the background.

FIGS. 12A to 12C are descriptive views of document display of the present invention in which there are provided two display areas on the display screen, and the display is switched over in units of area. A screen area 48-41 shown in FIG. 12A is in a state of initial display of document data: a first area 70 and a second area 72 are vertically displayed on the display area 48-41. This is the same layout as in FIG. 8A. When issuing an input instruction in the initial screen state shown in FIG. 12A, all of Line Nos. (11) to (15) for the first area 70 are rewritten as shown in FIG. 12B, the second area 72 showing the display before switchover, and the first area 70 showing the display after switchover. Another input instruction causes rewriting of data of Line Nos. (16) to (20) for the second area 72 as shown in FIG. 12C, and subsequently, the first area 70 and the second area 72 are alternately rewritten.

Figure 13:
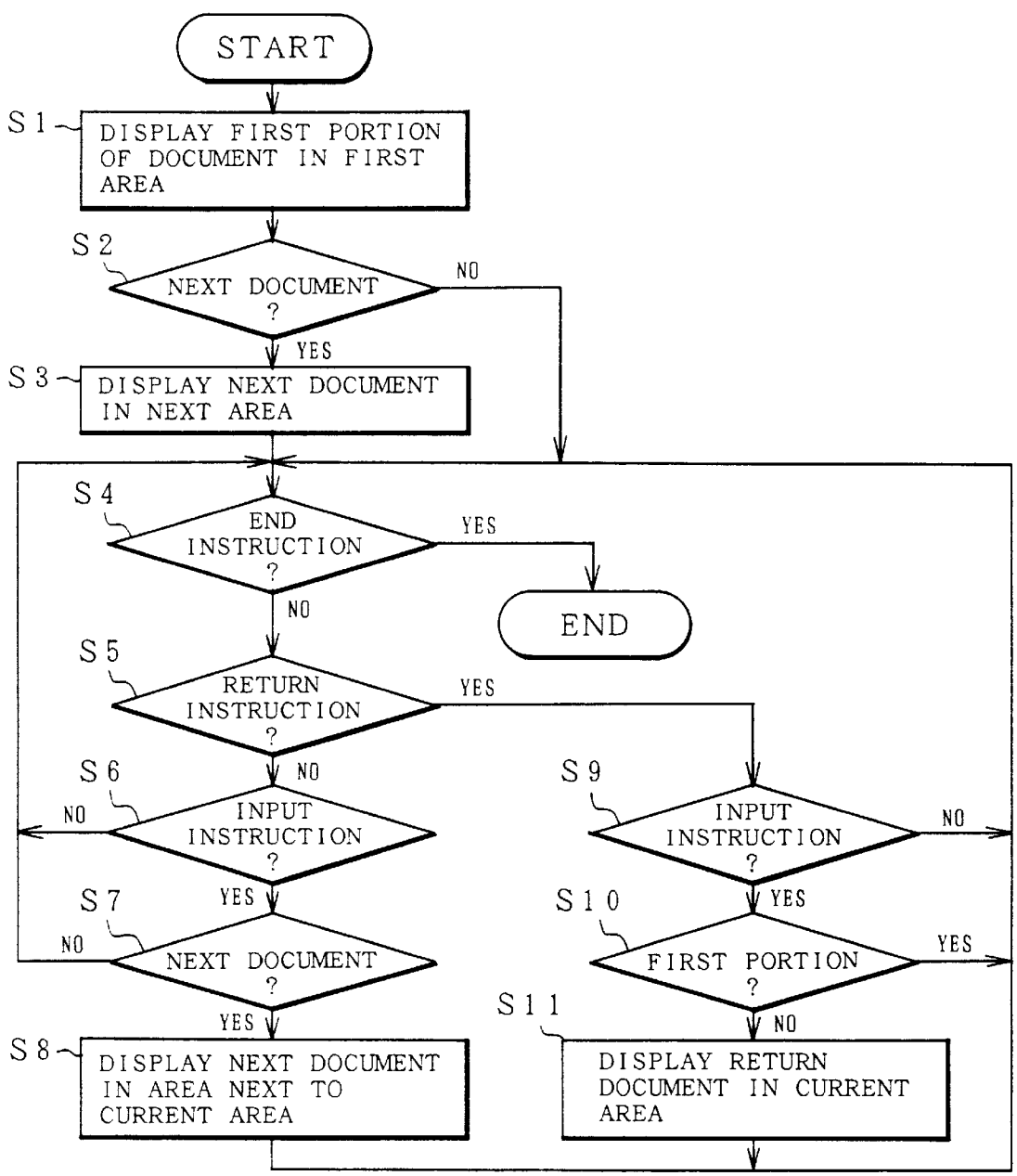
FIG. 13 is a flowchart of processing operations shown in FIGS. 12A to 12C.

FIG. 13 is a flowchart of document display processing in which the display is switched over in units of area of FIGS. 12A to 12C. First at step S1, a document initial unit is displayed in a first area 70 of FIG. 12A from among the specified document data. Then at step S2, the presence of a following document is checked, and at step S3, the following document, if any, is displayed in the second area serving as the next area. This brings about the state of display of initial display in the first area 70 and the second area 72. Then, after checking an end instruction at step S4, the presence of a return instruction is checked at step S5. Since there is initially no return institution, the presence of an input instruction is checked at step S6. If there is one, the presence of a following document is checked at step S7, and then, the following document, if any, is displayed in an area next to the area currently to be processed. In the initial screen shown in FIG. 12A, for example, the following document is displayed in the first area 70 and the display is switched over to the screen area 48-42 of FIG. 12B, since the area currently to be processed is the second area 72. When desiring to restore the display document during switched display in units of area as described above, it suffices to act on the return key 36. This permits identification of a return instruction at step S5, and then, upon every identification of an input instruction at step S9, it is checked if the display has returned to the initial document or not at step S10. If is has not, the return document is displayed in an area currently to be processed at step S11, because, in the state of display of FIG. 12C, for example, the display area currently to be processed is the second area 72, the return document is displayed in the second area 72. The term the display of return document used here comprises returning from Line No. (16) of the document in the first line of the second area 72 currently to be processed to Line No. (05), obtained by subtracting ten lines, the number of display lines in the first area 70 and the second area 72, and taking out document data of five lines including Line Nos. (06) to (10), the number of display lines in the second area 72 therefrom for display.

FIGS. 14A to 14C show another embodiment of screen display in a case where a display area is divided into a first area 70 and a second area 72 and the display is switched over in units of area. This embodiment is characterized in that an area before switchover and an area after switchover are discriminated by different background colors. The screen areas 48-41 to 48-43 of FIGS. 14A to 14C have the same contents of display as those shown in FIGS. 10A to 10C. As shown in FIG. 14B in which the first switchover of the display has been made, the background color is different between the second area before switchover 72 and the first area after switchover 70. Further issuance of an input instruction in the state of the screen area 48-42 shown in FIG. 14B brings about the screen area 48-43 of FIG. 14C. Since the area before switchover is the first area 70 and the area after switchover is the second area 72, these areas have different background colors. In addition to using different background colors between the areas before and after switchover in FIGS. 14A to 14C, different colors may be used for displayed characters between the areas before and after switchover.

FIGS. 15A and 15B are descriptive views of another display processing in a case where document display is carried out by dividing the display area into a first area 70 and a second area 72. FIG. 15A shows a screen area 48-51 of the initial display from among the document data 50 of FIG. 3: Document Nos. (01) to (05) are displayed in the first area 70 and Document Nos. (06) to (10) are displayed in the second area 72. When, in such a state of display of the document, document from Line No. (04) through Line No. (03) not currently displayed forms a series of continuous documents, these units must be displayed continuously on the screen. Under such circumstances, it suffices to move a cursor 80 on a screen area 48-51 as shown in FIG. 15A, set the cursor 80 at a line position which would become the top position of the continuous documents, and issue an input instruction. The cursor is moved by the use of a cursor moving key 40 provided in the input instruction unit of FIG. 2. When giving the input instruction by setting the cursor 80 as described above, the cursor 80 position is moved to the first line of the first area 70 as shown in FIG. 15B, the display is switched over to a screen area 48-52 which continuously displays the following documents from the first area 70 through the second area 72. This search function of continuous documents permits display and reading of a continuous complete document unit in the middle of a long document on a single screen.

According to the present invention, as described above, it is possible to continuously and smoothly read even a long document by overwriting the following documents from the top of an area on the screen, or display the document by alternately using two display areas. Because the line of vision when reading the document regularly reciprocate within a single document area or two document display areas, it is possible to alleviate fatigue of the eyes. Furthermore, because the document after switchover and the document before switchover are discriminated by means of different colors for partition line, background and characters, two documents can be distinctively discriminated, and the document can be smoothly read without confusing the two documents. It is also possible to arrange a series of documents from top to end, i.e., to perform searching, and to smoothly carry out operations of taking out necessary units in the document and reading such units by specifying an arbitrary line in the display area as the top position.

The above-mentioned embodiments cover cases of application as operating environment to a personal computer. In addition, the present invention is directly applicable to a workstation, a portable information processor, a host computer and other appropriate operating environments. The shape and size of the display area on the display may be appropriately selected, depending upon the display unit used, and is not limited to the number of lines and arrangement of the embodiments.

What is claimed is:

1. An apparatus for controlling of displaying a document on a screen area of a display unit, comprising:

a display processing unit selecting a data area corresponding to said screen area from a document data stored in a document storage unit so as to display the selected data area in the display unit; and a display switch over unit selecting said another data area not currently displayed on said screen area, in units of at least a line, and switching over the display so as to display the selected another data area at the display line currently located at the top of the selected data area currently displayed wherein data displayed on said screen area is scrollable.

2. The apparatus according to claim 1, wherein said display switchover unit displays a partition line between a switchover-displayed area and an area before switchover of the display.

3. The apparatus according to claim 1, wherein characters in the switchover-displayed area and the area before switchover of the display are displayed in different colors.

4. The apparatus according to claim 1, wherein a background of the switchover-displayed area and the area before switchover of the display are displayed in different colors.

5. An apparatus for controlling of displaying a document on a screen area of a display unit, comprising:

a display processing unit selecting a data area corresponding to said screen area from the document data stored in a document storage unit so as to display the selected data area in said display unit;

a display switchover unit selecting said another data area not currently displayed in said screen area, in units of at least a line, so as to switch-over the display to display the selected another data area at the display line currently located at the top of the selected data area currently displayed, wherein when a return direction is specified as a direction for display switchover of said document data, said switchover display unit selects a data area going back by an extent corresponding to said screen area in units of at least a line, and switchover-displays the selected data area at the display line currently located at the top of the selected data area currently displayed, and wherein data displayed on said screen area is scrollable.

6. A method of displaying a document on a display, which comprises:

a displaying step of selecting a data area corresponding to a screen area having a prescribed number of lines from document data stored in a document storage unit and displaying the selected data area in a display unit;

an input instructing step of instructing display of another data area not currently displayed in said screen area; and a display switchover step of selecting the another data area not currently displayed in said screen area in units of at least a line, and switchover-displaying the selected another data area at the display line currently located at the top of the selected data area currently displayed wherein data displayed on said screen area is scrollable.

7. The method according to claim 6, wherein said display switchover step comprises displaying a partition line between the switchover-displayed area and the area before switchover.

8. The method according to claim 6, wherein said display switchover step comprises displaying characters in the switchover-displayed area and the area before switchover in different colors.

9. The method according to claim 6, wherein said display switchover step comprises displaying backgrounds in the switchover-displayed area and the area before switchover in different colors.

10. A method of displaying a document on a display, comprising:

a displaying step of selecting a data area corresponding to a screen area having a prescribed number of lines from document data stored in a document storage unit and displaying the selected data area in a display unit;

an input instructing step of instructing display of another data area not currently displayed in said screen area; and a display switchover step of selecting the another data area not currently displayed in said screen area in units of at least a line, and switchover-displaying the selected another data area at the display line currently located at the top of the selected data area currently displayed, wherein said display switchover step comprises, when a return direction is specified as a direction for display switchover of said document data, selecting a data area going back by an extent corresponding to said screen area in units of at least a line, and switchover-displaying the selected data area at the display line currently located at the top of the selected data area currently displayed, and wherein data displayed on said screen area is scrollable.

11. An apparatus for controlling of displaying a document on a screen area of a display unit, comprising:

a display processing unit selecting data areas corresponding to a first display area and a second display area from document data stored in a document storage unit, so as to display the selected data areas, respectively;

a display switchover unit selecting the another data area not currently displayed in the display area in units of at least a line so as to switchover-&splay the selected another data area at the first display area or the second display area in which the top display line is currently located, wherein the selected data areas displayed are scrollable.

12. The apparatus according to claim 11, wherein said display switchover unit switches over the display between said first display area and said second display area alternately and sequentially.

13. The apparatus according to claim 11, wherein said display switchover unit displays a partition line which discriminates the switchover-displayed area from the area before switchover display.

14. The apparatus according to claim 11, wherein said display switchover unit displays characters in the switchover-displayed area and the area before switchover in different colors.

15. The apparatus according to claim 11, wherein said display switchover unit displays backgrounds of the switchover-displayed area and the area before switchover in different colors.

16. An apparatus for controlling of displaying a document on a screen area of a display unit, comprising:

a display processing unit selecting data areas corresponding to a first display area and said second display area from document data stored in a document storage unit, so as to display the selected data areas, respectively; and a display switchover unit selecting the another data area not currently displayed in the display area in units of at least a line so as to switchover-display the selected another data area at a position above or beneath the first display area or the second display area in which the top display line is currently located, wherein when the return direction is specified as the direction for display switchover of said document data, said switchover display unit selects an area going back by an extent corresponding to said screen area in units of at least a line, and switchover-displays the selected data area at a line position currently located at the top of the first or the second display area, and wherein the selected data areas displayed are scrollable.

17. An apparatus for controlling of displaying a document on a screen area of a display unit, comprising:

a display processing unit selecting data areas corresponding to a first display area and a second display area from document data stored in a document storage unit so as to display the selected data areas, respectively; and a display switchover unit selecting the another data area not currently displayed in the display area in units of at least a line, on the basis of an instruction from said input instruction unit, so as to switchover-display the selected another data area at a position in which the top display line is currently located in the first display area or the second display area, wherein when an arbitrary line of said first display area or said second display area is specified as the top position, said display switchover unit switchover-displays said specified top position to be located at the position of the top line in said first area, and wherein the selected data areas displayed are scrollable.

18. The apparatus according to claim 11, wherein said first and second display areas have congruent shapes and are arranged side-by-side on the display unit.

19. The apparatus according to claim 11, wherein said first and second display areas have congruent shapes and are arranged one above the other.

20. A method for displaying a document on a display, which comprises:

a displaying step of selecting data areas corresponding to the screen area divided into a first display area and a second display area, and displaying the selected data areas, respectively;

an input instructing step of instructing display switchover of another data area not currently displayed in said screen area; and a display switchover step of selecting the another data area not currently displayed in said screen area in units of at least a line on the basis of said input instruction, and switchover-displaying the selected another data area at the display line currently located at the top of the selected data area currently displayed, wherein the selected data areas displayed are scrollable.

21. The method according to claim 20, wherein said display switchover step comprises switching over the display between said first display area and said second display area alternately and sequentially.

22. The method according to claim 20, wherein said display switchover step comprises displaying a partition line which discriminates the switchover-displayed area from the area before switchover display.

23. The method according to claim 20, wherein said display switchover step comprises displaying characters in the switchover-displayed area and the area before switchover display in different colors.

24. The method according to claim 20, wherein said display switchover step comprises displaying backgrounds in the switchover-displayed area and the area before switchover display in different colors.

25. A method for displaying a document on a display, which comprises:

a displaying step of selecting data areas corresponding to the screen area divided into a first display area and a second display area, and displaying the selected data areas, respectively;

an input instructing step of instructing display switchover of another data area not currently displayed in said screen area; and a display switchover step of selecting the another data area not currently displayed in said screen area in units of at least a line on the basis of said input instruction, and switchover-displaying the selected another data area at the display line currently located at the top of the selected data area currently displayed, wherein when the return direction is specified as the direction for display switchover of said document data, said display switchover step comprises selecting a data area going back by an extent corresponding to said screen area in units of at least a line, and switchover-displaying the selected data area at a line position currently located at the top of the first or the second display area, and wherein the selected data areas displayed are scrollable.

26. A method for displaying a document on a display, which comprises:

a displaying step of selecting data areas corresponding to the screen area divided into a first display area and a second display area, and displaying the selected data areas, respectively;

an input instructing step of instructing display switchover of another data area not currently displayed in said screen area; and a display switchover step of selecting the another data area not currently displayed in said screen area in units of at least a line on the basis of said input instruction, and switchover-displaying the selected another data area at the display line currently located at the top of the selected data area currently displayed, wherein when an arbitrary line of said first display area or said second display area as the top position, said display switchover step includes switchover-displaying said specified top position to be located at the position of the top line in said first area and wherein the data areas displayed are scrollable.

27. A computer software product that includes a medium readable by a processor, the medium having stored thereon:

a displaying step of selecting a data area corresponding to a screen area having a prescribed number of lines from document data stored in a document storage unit and displaying the selected data area in a display unit;

an input instructing step of instructing display of another data area not currently displayed in said screen area; and a display switchover step of selecting the another data area not currently displayed in said screen area in units of at least a line, and switchover-displaying the selected another data area at the display line currently located at the top of the selected data area currently displayed, wherein the selected data area displayed is scrollable.

28. A computer software product that includes a medium readable by a processor, the medium having stored thereon:

a displaying step of selecting a data area corresponding to a screen area having a prescribed number of lines from document data stored in a document storage unit and displaying the selected data area in a display unit;

an input instructing step of instructing display of another data area not currently displayed in said screen area; and a display switchover step of selecting the another data area not currently displayed in said screen area in units of at least a line, and switchover-displaying the selected another data area at the display line currently located at the top of the selected data area currently displayed, wherein said display switchover step comprises, when a return direction is specified as a direction for display switchover of said document data, selecting a data area going back by an extent corresponding to said screen area in units of at least a line, and switchover-displaying the selected data area at the display line currently located at the top of the selected data area currently displayed, and wherein the data area displayed is scrollable.

29. A computer software product that includes a medium readable by a processor, the medium having stored thereon:

a displaying step of selecting data areas corresponding to the screen area divided into a first display area and a second display area, and displaying the selected data areas, respectively;

an input instructing step of instructing display switchover of another data area not currently displayed in said screen area; and a display switchover step of selecting the another data area not currently displayed in said screen area in units of at least a line on the basis of said input instruction, and switchover-displaying the selected another data area at the display line currently located at the top of the selected data area currently displayed.

30. A computer software product that includes a medium readable by a processor, the medium having stored thereon:

a displaying step of selecting data areas corresponding to the screen area divided into a first display area and a second display area, and displaying the selected data areas, respectively;

an input instructing step of instructing display switchover of another data area not currently displayed in said screen area; and a display switchover step of selecting the another data area not currently displayed in said screen area in units of at least a line on the basis of said input instruction, and switchover-displaying the selected another data area at the display line currently located at the top of the selected data area currently displayed, wherein when the return direction is specified as the direction for display switchover of said document data, said display switchover step comprises selecting a data area going back by an extent corresponding to said screen area in units of at least a line, and switchover-displaying the selected data area at a line position currently located at the top of the first or the second display area.

31. A computer software product that includes a medium readable by a processor, the medium having stored thereon:

a displaying step of selecting data areas corresponding to the screen area divided into a first display area and a second display area, and displaying the selected data areas, respectively;

an input instructing step of instructing display switchover of another data area not currently displayed in said screen area; and a display switchover step of selecting the another data area not currently displayed in said screen area in units of at least a line on the basis of said input instruction, and switchover-displaying the selected another data area at the display line currently located at the top of the selected data area currently displayed, wherein when an arbitrary line of said first display area or said second display area as the tops position, said display switchover step includes switchover-displaying said specified top position to the located at the position of the top line in said first area.

32. The apparatus of claim 1, further comprising:

a display unit displaying a document on a screen area having a prescribed number of lines; and an input instruction section instructing display of another data area not currently displayed on said screen area.

33. The apparatus of claim 5, further comprising:

a display unit dividing a screen area into a first display area and a second display area to display respective documents; and an input instruction section instructing display of another data area not currently displayed on said screen area.

34. The apparatus of claim 11, further comprising:

a display unit dividing a screen area into a first display area and a second display area to display respective documents; and an input instruction unit instructing display switchover of another data area not currently displayed in the display area of said screen.

35. The apparatus of claim 16, further comprising:

a display unit dividing a screen area into a first display area and a second display area to display respective documents; and an input instruction unit instructing display switchover of another data area not currently displayed in the display area of said screen.

36. The apparatus of claim 17, further comprising:

a display unit dividing a screen area into said first display area and said second display area to display respective documents; and an input instruction unit instructing display switchover of another data area not currently displayed in the display area of said screen.

37. An apparatus for controlling of displaying a document on a screen area of a display unit, comprising:

a display processing unit selecting a data area corresponding to said screen area from a document data stored in a document storage unit so as to display the selected data area in the display unit; and a display switch over unit selecting said another data area not currently displayed on said screen area, in units of at least a line, and switching over the display so as to display the selected another data area at the display line currently located at the top of the selected data area currently displayed, wherein the data area is replaced by the selected another data area.

* * * * *